UNITED STATES PATENT OFFICE 2,241,542

MANUFACTURE OF NITROGEN DERIVATIVES OF CELLULOSE

Henry Dreyfus, London, England

No Drawing. Application January 30, 1940, Serial No. 316,369. In Great Britain January 26, 1939

15 Claims. (Cl. 260—212)

This invention relates to the production of artificial materials, and in particular to the production of artificial materials containing nitrogen.

I have found that valuable cellulose derivatives containing nitrogen may be obtained by subjecting cellulose derivatives which contain aryl-sulphonyl radicles to the action of compounds containing at least two basic nitrogen atoms.

A wide range of nitrogen-containing compounds is available for use according to the invention of which the most important are compounds in which the nitrogen atoms are attached directly to carbon atoms of aliphatic groups, i. e. carbon atoms which are not members of an aromatic ring. Among such compounds the following may be mentioned, for example, trimethylene diamine, tetramethylene diamine, $\beta\beta'$-diaminodiethyl ether, diethylene-triamine, the xylylene diamines, and homologues of these compounds, and corresponding secondary nitrogen compounds, e. g. N-monoalkyl compounds. The compounds may contain both nitrogen-containing groups and other substituent atoms or radicles. For example, $\beta$-oxytrimethylene diamine and $\beta$-chlortrimethylene diamine may be employed, as also may urea. Preferably the nitrogen-containing compounds are such as have a chain of at least three atoms separating two nitrogen atoms.

Cellulose derivatives which are treated according to the process of the invention may contain aryl-sulphonyl radicles directly attached to carbon atoms of the cellulose nucleus or as substituent radicles in other groups which are themselves attached to the nucleus, e. g. as substituents for the hydroxyl group in a hydroxy-alkyl group. Thus the cellulose derivatives may be simple cellulose aryl-sulphonates or they may contain, for example, aryl-sulphonated hydroxy-alkyl groups. The cellulose derivatives may contain both types of substituent radicles, as for example in aryl-sulphonyl-ethyl cellulose aryl-sulphonate. The aryl-sulphonyl derivatives preferably contain one or more organic radicles free from aryl-sulphonyl radicles, e. g. organic ester radicles such as, for example, acetyl, propionyl, lactyl or oxalyl, or ether radicles such as, for example, ethyl, propyl, hydroxyethyl or carboxyethyl. Advantageously the cellulose derivative is one which may be regarded as an aryl-sulphonyl derivative of an organic derivative of cellulose which is soluble in organic solvents, and is thus one which, disregarding the aryl-sulphonyl radicles, contains directly attached to the cellulose nucleus a relatively high proportion of organic radicles, e. g. 1.5, 2 or 2.5 radicles per $C_6H_{10}O_5$ nucleus.

The cellulose derivatives containing aryl-sulphonyl radicles may be prepared, for example, by treating cellulose or an organic derivative of cellulose containing free hydroxyl radicles, e. g. cellulose acetate of 50–56% acetyl content calculated as acetic acid, with a substantial excess of p-toluene sulphonyl chloride in a non-solvent medium, e. g. benzine, and in the presence of an alkaline reagent, e. g. pyridine. They may also be prepared in the presence of a solvent for the starting material and/or the product. Other aryl-sulphonating agents, e. g. halides of benzene-sulphonic acid and of $\beta$-naphthyl sulphonic acid, may also be employed.

The invention is of the great importance in relation to the treatment of the aryl-sulphonyl derivatives in fibrous or filamentary form, produced, for example, by reacting cotton fibres, regenerated cellulose filaments or staple fibres, and particularly cellulose derivative filaments or staple fibres, especially such cellulose derivative materials as are soluble in organic solvents, with the aryl-sulphonating agents. Thus, for example, cellulose acetate filaments formed by extruding an acetone solution of cellulose acetate into a setting medium, especially an evaporative atmosphere, or fibres formed therefrom, may be aryl-sulphonated in a non-solvent medium as described above and then subjected to treatment with a nitrogen-containing compound according to the invention. The filaments or fibres may be in loose bundles or may be in the form of yarns or fabrics. Alternatively, filaments or fibres containing the aryl-sulphonyl derivatives may be formed by extruding solutions of the derivatives into suitable setting media, and materials so formed may be treated according to the invention. Films and other solid forms of the aryl-sulphonyl derivatives may also be treated according to the invention.

The invention may also be applied to aryl-sulphonyl derivatives while they are in solution. Thus, the derivatives may be treated while dissolved in, for example benzyl alcohol, dioxane or pyridine or in the nitrogen-containing reagent itself. It is preferable to employ as solvent or as part of the solvent medium an alkaline agent which, if it is other than the nitrogen-containing reagent, does not tend to form a derivative of cellulose but which will assist in neutralising aryl-sulphonic acid released.

In treating the aryl-sulphonyl derivatives, the nitrogen containing compound is preferably employed in liquid form. Thus, a solid or liquid nitrogen-containing compound may be dissolved in a suitable solvent, which is advantageously alkaline in reaction though it should preferably not be of such nature as to react with the aryl-sulphonate but only to neutralise the aryl-sulphonic acid set free, and added as such; for example the compound may be dissolved in pyridine. In any event it is generally desirable to employ the nitrogen-containing compound in the presence of a diluent, preferably organic, in order to permit satisfactory control of the reaction.

The temperature of the reaction largely depends upon the nature of the reagents and upon the degree of dilution. It is preferably maintained at a relatively low value, e. g. from normal room temperature or below up to about 50° C. However, higher temperatures, e. g. 100° C., 120° C. or more may be employed. The reaction may be carried out in an open or closed vessel or under reflux, according to the properties of the substances present in the reaction medium. The time of reaction depends on the other conditions and on the degree of reaction which is required. Times of reaction of the order of 2-4, up to 24, 48 or even more hours may be employed, depending inter alia on the degree of replacement of aryl-sulphonyl radicles by nitrogen-containing groups which is required.

By the process according to the invention there may be produced cellulose derivatives which contain nitrogen and cellulose derivatives containing both nitrogen and aryl-sulphonyl groups, which have a relatively slight solubility in the usual organic solvents and a good dyestuff affinity. When the process of the invention is applied to filamentary materials and the like having a basis of aryl-sulphonated cellulose derivatives soluble in organic solvents, products may be produced which have an increased resistance to ironing and which have a high tenacity, particularly if the materials have been pre-stretched in a hot aqueous medium, e. g. hot water or wet steam, or in an organic swelling medium.

*Example 1*

One part of a yarn, having a basis of filaments of cellulose acetate (acetyl value 54%, calculated as acetic acid) which have been produced by dry-spinning an acetone solution of cellulose acetate and stretching to 200% of their original length in wet steam, is immersed in 10 parts by weight of a benzine solution of 1 part by weight of p-toluene-sulphonyl chloride and 0.5 part by weight of pyridine. The temperature is kept below 30° C. and after an hour the yarn is removed and washed with benzine and with water, and then dried. The treated yarn is then immersed in 10 parts by weight of a 5% solution of trimethylene diamine in benzine, the temperature gradually raised to 40° C. over a period of one hour and maintained for a further seven hours. After draining off the liquor and washing thoroughly with benzine and water the yarn is found to have a good affinity for acid dyestuffs and a high tenacity and to be substantially less soluble in acetone than the original cellulose acetate materials.

*Example 2*

One part of a yarn having a basis of hydroxy-ethyl cellulose acetate (acetyl value 44.8% calculated as acetic acid, and hydroxy-ethyl content 8.4%) is treated in the same manner as the yarn of Example 1. A similar modification in properties results.

*Example 3*

Cellulose p-toluene sulphonate, prepared by treating cellulose dissolved in caustic soda solution with 9 times its weight of a 50% solution of p-toluene sulphonyl chloride in a mixture of benzine and toluene (50:50), is dissolved in an 80:20 mixture of dioxane and ethyl alcohol to form a 20% solution. The resulting solution is dry-spun to form filaments. One part of the filaments so produced is immersed in 10 parts of a 5% solution of trimethylene diamine in benzine and the temperature maintained at 45° C. for 24 hours. The product, after washing with benzine and water, readily takes up acid dyestuffs.

Having described my invention, what I desire to secure by Letters Patent is:

1. Process for the production of cellulose derivatives containing nitrogen, which comprises subjecting a substitution derivative of cellulose, which contains an aryl-sulphonyl radicle, to the action of a compound containing at least two basic nitrogen atoms which are separated by a chain of at least three atoms.

2. Process for the production of cellulose derivatives containing nitrogen, which comprises subjecting a substitution derivative of cellulose, which contains an aryl-sulphonyl radicle, to the action of a compound containing at least two basic nitrogen atoms which are directly attached to carbon atoms in aliphatic groups and which are separated by a chain of at least three atoms.

3. Process for the production of cellulose derivatives containing nitrogen, which comprises subjecting a substitution derivative of cellulose, which contains an aryl-sulphonyl radicle directly attached to a carbon atom of the cellulose nucleus, to the action of a compound containing at least two basic nitrogen atoms which are directly attached to carbon atoms in aliphatic groups and which are separated by a chain of at least three atoms.

4. Process for the production of cellulose derivatives containing nitrogen, which comprises subjecting a substitution derivative of cellulose, which contains an aryl-sulphonyl radicle and at least one organic radicle free from aryl-sulphonyl radicle, to the action of a compound containing at least two basic nitrogen atoms which are directly attached to carbon atoms in aliphatic groups and which are separated by a chain of at least three atoms.

5. Process for the production of cellulose derivatives containing nitrogen, which comprises subjecting a substitution derivative of cellulose, which may be regarded as an aryl-sulphonyl derivative of an organic derivative of cellulose which is soluble in organic solvents, to the action of a compound containing at least two basic nitrogen atoms which are directly attached to carbon atoms in aliphatic groups and which are separated by a chain of at least three atoms.

6. Process for the production of cellulose derivatives containing nitrogen, which comprises subjecting a substitution derivative of cellulose, which contains aryl-sulphonyl radicle, in a solid formed condition, to the action of a compound which contains at least two basic nitrogen atoms which are directly attached to carbon atoms in aliphatic groups and which are separated by a chain of at least three atoms.

7. Process for the production of cellulose derivatives containing nitrogen, which comprises subjecting a substitution derivative of cellulose, which may be regarded as an aryl-sulphonyl derivative of an organic derivative of cellulose which is soluble in organic solvents, in a solid formed condition, to the action of a compound which contains at least two basic nitrogen atoms which are directly attached to carbon atoms in aliphatic groups and which are separated by a chain of at least three atoms.

8. Process for the production of cellulose derivatives containing nitrogen, which comprises subjecting a substitution derivative of cellulose, which contains aryl-sulphonyl radicle, at a temperature below about 50° C. to the action of a compound which contains at least two basic nitrogen atoms which are directly attached to carbon atoms in aliphatic groups and which are separated by a chain of at least three atoms.

9. Process for the production of cellulose derivatives containing nitrogen, which comprises subjecting a substitution derivative of cellulose, which may be regarded as an aryl-sulphonyl derivative of an organic derivative of cellulose which is soluble in organic solvents, at a temperature below about 50° C. to the action of a compound containing at least two basic nitrogen atoms which are directly attached to carbon atoms in aliphatic groups and which are separated by a chain of at least three atoms.

10. Process for the production of cellulose derivatives containing nitrogen, which comprises subjecting a substitution derivative of cellulose, which contains aryl-sulphonyl radicle, in a solid formed condition and at a temperature below about 50° C. to the action of a compound which contains at least two basic nitrogen atoms which are directly attached to carbon atoms in aliphatic groups and which are separated by a chain of at least three atoms.

11. Process for the production of shaped artificial materials having a basis of a cellulose derivative containing nitrogen, which comprises shaping and setting a solution of an organic substitution derivative of cellulose in a volatile organic solvent, treating the set material with an aryl-sulphonating agent, and subjecting the resulting material to the action of a compound containing at least two basic nitrogen atoms which are directly attached to carbon atoms in aliphatic groups and are separated by a chain of at least three atoms.

12. Process for the production of shaped artificial materials having a basis of a cellulose derivative containing nitrogen, which comprises shaping and setting a solution of an organic substitution derivative of cellulose in a volatile organic solvent, treating the set material with an aryl-sulphonating agent, and subjecting the resulting material at a temperature below about 50° C. to the action of a compound containing at least two basic nitrogen atoms which are directly attached to carbon atoms of aliphatic groups and are separated by a chain of at least three atoms.

13. Substitution derivatives of cellulose which contain, combined with the cellulose nucleus, the residue of a compound containing at least two basic nitrogen atoms which are directly attached to carbon atoms in aliphatic groups and which are separated by a chain of at least three atoms.

14. Shaped artificial materials having a basis of a substitution derivative of cellulose which contains, combined with the cellulose nucleus, the residue of a compound containing at least two basic nitrogen atoms which are separated by a chain of at least three atoms.

15. Shaped artificial materials having a basis of a substitution derivative of cellulose which contains, combined with the cellulose nucleus, the residue of a compound containing at least two basic nitrogen atoms which are directly attached to carbon atoms in aliphatic groups and which are separated by a chain of at least three atoms.

HENRY DREYFUS.